United States Patent [19]

Haggerty

[11] Patent Number: 4,911,836

[45] Date of Patent: Mar. 27, 1990

[54] SUBMERGED AERATION SYSTEM

[76] Inventor: T. G. Haggerty, 1202 Highland Blvd., #75, Bozeman, Mont. 59715

[21] Appl. No.: 230,156

[22] Filed: Aug. 8, 1988

[51] Int. Cl.$^4$ .............................................. C02F 7/00
[52] U.S. Cl. ................................... 210/170; 210/220; 261/77
[58] Field of Search .................. 261/DIG. 75, 76, 77, 261/121.1, 124; 210/170, 220, 221.2

[56] References Cited

U.S. PATENT DOCUMENTS

| | | | |
|---|---|---|---|
| 4,226,719 | 10/1980 | Woltman | 261/DIG. 75 |
| 4,261,347 | 4/1981 | Spencer, III et al. | 261/DIG. 75 |
| 4,487,553 | 12/1984 | Nagata | 261/DIG. 75 |
| 4,522,151 | 6/1985 | Arbisi et al. | 261/DIG. 75 |
| 4,562,014 | 12/1985 | Johnson | 261/DIG. 75 |
| 4,743,405 | 5/1988 | Durao et al. | 261/DIG. 75 |

Primary Examiner—Tom Wyse
Attorney, Agent, or Firm—Richard C. Conover

[57] ABSTRACT

The present invention is directed to an efficient aeration system for use in a pool or lagoon. The system employs a venturi nozzle structure for mixing air and water. With this nozzle, multiple air streams surround a water stream to promote effective mixing. The air water mixture is discharged into a long discharge pipe which extends the mixing time for the air/water mixture leaving the turbulent mixing zone of the nozzle. Small holes drilled in the upper wall of the discharge pipe permits smaller bubbles to escape along the pipe while larger bubbles which have not yet been broken are carried further down the pipe. Further, the discharge pipe of the present invention is made larger than the nozzle area in order to slow the flow of the air/water mixture when passing through the pipe.

2 Claims, 1 Drawing Sheet

SUBMERGED AERATION SYSTEM

BACKGROUND OF THE INVENTION

This invention relates to a submerged aeration system for effectively mixing air and water for use in open bodies of water such as sewage treatment lagoons, oxidation ponds, oxidation ditches, fish pond, reservoirs and the like.

In many communities, waste treatment directs liquid effluent into holding lagoons, or pools where the effluent is exposed to oxygen for a period sufficient to allow bacteria to break down suspended organic matter. Aeration can be accomplished imply by exposing the large surface area of the lagoon to the atmosphere. However, when this simple form of aeration is not adequate, mechanical aeration must be provided.

An aeration cycle typically takes 50–60 days in open lagoons where there is no mechanical mixing and on the order of 25–30 days where there is aeration of the lagoon water.

Pumping air into the lagoon water and mixing the air with the water is a more efficient means of aerating water than just having a body of water exposed to the air.

Several systems are known which accomplish the aeration function by diffusing air with lagoon water. For example, see U.S. Pat. No. 2,221,346 to Durdin, U.S. Pat. No. 4,029,581 to Clough, Jr. et al., and U.S. Pat. No. 3,782,701 to Hunt. These patents illustrate systems where air is pumped into submerged pipes and allowed to exit therefrom through discharge holes. Mixing of air and water occurs after the air exits the pipe. With these systems, the mixing occurs as the air bubbles drift upward toward the surface. A problem of these systems is that it is difficult to make the bubbles of air small enough so as to maximize the water/air interface for efficient absorption of the air into the surrounding water in the time interval between the time the bubbles leave the system and before they reach the surface.

Other systems use nozzles to effect the mixing of air and water within the system in a turbulent zone located near the nozzle and then discharge an air-water mixture into the lagoon. U.S. Pat. No. 3,893,924 to LeCompte, Jr. et al.; U.S. Pat. No. 4,210,534 to Molvar; and West German Patent No. 2,826,259 illustrate systems where the air and water are mixed in a nozzle which mixture is then discharged back into the lagoon. The discharge is directly from the nozzle to the lagoon in these systems so that most of the mixing occurs during the time interval individual molecules of air and water spend in the turbulent zone of the nozzle. Only a small part of the mixing occurs after the air bubbles leave the system. Both of the patents identified above describe systems wherein an incoming air stream surrounds the incoming water stream as the mixture enters the turbulent zone of the nozzle.

Long discharge pipes to extend the mixing time are also known in the art. U.S. Pat. No. 4,005,015 to Boward, Jr. and U.S. Pat. No. 4,271,099 to Kukla illustrate the use of long discharge tubes. In both cases, the discharge takes place at the end of the tube rather than along the tube. Thus, the discharge of the air-water mixture back into the surrounding water is concentrated near a single point. Large bubbles may reach the surface which dissipates the air and lowers the efficiency of the system.

SUMMARY OF INVENTION

The present invention is directed to an efficient aeration system for use in a pool, lagoon, or tank. The system is constructed of easily available components and employs a novel nozzle structure which has water surrounding an air stream to promote effective mixing of the air and water. The air-water mixture is discharged into a long discharge pipe which extends the mixing time for an air-water mixture leaving the turbulent mixing zone of the nozzle. Small holes drilled in the upper wall of the discharge pipe permit smaller bubbles to escape along the pipe, but cause the larger bubbles that have not yet been broken up to be carried along with further breakdown into smaller bubbles occurring downstream in the turbulent flow in the pipe.

The discharge pipe in the present invention is made larger than the nozzle area in order to slow the flow of the air-water mixture through the pipe. This permits the air bubbles to be broken down into small bubbles over a longer period of time or be absorbed in the turbulent flow. Early tests of the present invention have shown that almost none of the air is discharged from the end of the pipe as large bubbles, but rather is absorbed or escapes as small bubbles before ever reaching the discharge end.

The apparatus of the present invention is particularly designed to be used with smaller sewer treatment facilities of rural communities or smaller towns. It is particularly useful where an inexpensive aeration system is needed and where a minimum of installation and maintenance time is required.

BRIEF DESCRIPTION OF THE DRAWINGS

In order that the invention may be clearly understood and readily carried into effect, preferred embodiments of the invention will now be described, by way of example only, with reference to the accompanying drawings.

DESCRIPTION OF A PREFERRED EMBODIMENT

Figure 1:
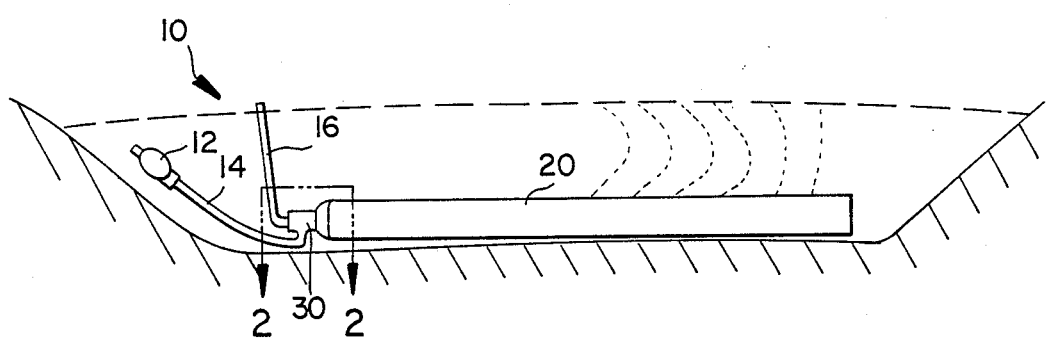
FIG. 1 is a side view in partial cross-section illustrating the installation of the submerged aeration system.

A submerged aeration system 10 according to the present invention is shown in FIG. 1. System 10 uses a pump 12 to pump lagoon water through water pipe 14 to nozzle 30. Pump 12 is preferably a submersible pump having an inlet communicating directly with the lagoon water and having an outlet connected to one end of water pipe 14.

Air from the atmosphere is drawn toward nozzle 30 through air intake pipe 16 whenever pump 12 is operating.

Figure 2:
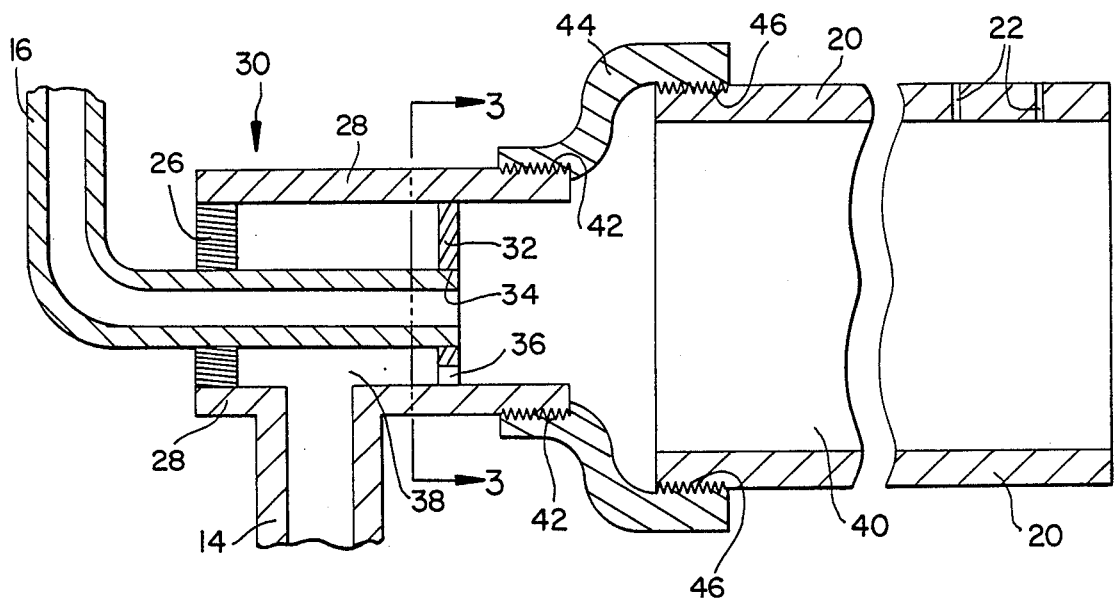
FIG. 2 is a cross-sectional view along line 2—2 shown in FIG. 1.

Nozzle 30 is shown in cross-section in FIG. 2. This nozzle includes a nozzle housing 28 which in a preferred embodiment is a "T" pipe with a nozzle pressure fitting 26 located is one of two coaxial arms of the "T" pipe nozzle housing 28 for receiving air intake pipe 16. The fitting 26 is conventionally constructed to prevent water under pressure within nozzle 30 from escaping around air intake pipe 16.

Figure 3:
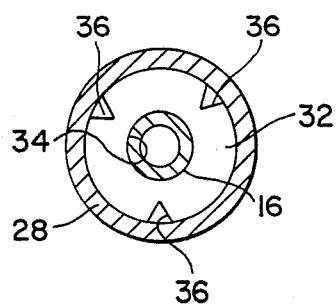
FIG. 3 is a cross-sectional view along line 3—3, shown in FIG. 2, showing a nozzle discharge plate with background structure removed.

Nozzle 30 further includes a nozzle discharge plate 32 located in the second coaxial arm of "T" pipe nozzle housing 28. In a preferred embodiment, the nozzle discharge plate 32 is a generally flat ad circular plate having a central bore 34 therethrough. Further, a series of notches 36 are cut around the perimeter of discharge plate 32 as shown in FIG. 3.

A chamber 38 is formed within nozzle 30 and is bound by nozzle housing 28, nozzle pressure fitting 26 and nozzle discharge plate 32.

Air intake pipe 16 is received by pressure fitting 26 and extends through chamber 38 to nozzle discharge plate 32. At the nozzle discharge plate end of air intake pipe 16 the pipe is aligned with and friction-fitted within bore 34 of the nozzle discharge plate 32 as shown in FIG. 2.

Water pipe 14 is connected to an arm of "T" pipe nozzle housing 28 which is at a right angle to the coaxial arms of the "T" pipe.

The second coaxial arm of "T" pipe nozzle housing 28, in which the discharge plate 32 is mounted, is provided with threads 42. A pipe adapter 44 has its smaller diameter end threaded on threads 42 and has its larger diameter end threaded on a discharge pipe 20 by threads 46 as shown in FIG. 2.

Discharge pipe 20 has an initial mixing section which has no perforations in order to promote further mixing of the air and water. Downstream of this initial mixing section, there is provided small bubble holes 22 which are drilled along the top of the pipe 20.

With the present invention water from pump 12 is pumped under pressure into chamber 38 and discharged through notches 36 into discharge pipe 20. Water flowing through notches 38 creates a venturi effect drawing air from air intake pipe 16 into the low pressure area created downstream of nozzle discharge plate 32. Air and water are then mixed in the turbulent flow leaving nozzle 30. This mixture is discharged into pipe 20 which has a larger diameter than the discharge end of nozzle 30. The velocity of the air-water mixture is reduced in pipe 20 and the larger air bubbles begin to breakdown into smaller bubbles as the air-water mixture moves downstream. Holes 22 permit only the smaller bubbles to pass into the pond or lagoon while the larger bubbles continue downstream in pipe 20. The length of the discharge pipe 20 is such that air will either be absorbed within the air-water mixture flowing in pipe 20 or will exit as small bubbles at one of the holes 22 extending along the distal portion of pipe 20.

As can be ascertained, the components of the present invention other than nozzle discharge plate 32 are commonly available plumbing supplies. The present invention is easy to construct from materials easily obtained. As a consequence, the present invention provides an efficient, inexpensive aeration system for smaller ponds and lagoons.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A system for aerating lagoon water comprising:
   a water pump having an intake port communicating with the lagoon and a discharge port for supplying water under pressure;
   a nozzle having a water inlet port, an air inlet port, a pressure chamber, and a discharge port;
   a water inlet pipe connected at one end to the discharge port of the water pump and connected at the other end to the water inlet port of the nozzle to supply water under pressure to the pressure chamber of the nozzle;
   an air intake pipe for supplying air to the air inlet port of the nozzle;
   the nozzle further including mixing means for mixing air and water and diverting the air-water mixture to the nozzle discharge port as water is supplied to the nozzle under pressure and air is supplied from the air intake pipe;
   the mixing means including a nozzle discharge plate mounted in the discharge port;
   the nozzle discharge plate having a central bore therethrough perpendicular to the nozzle discharge plate and further having a plurality of openings around the perimeter of the plate;
   the air intake pipe positioned to extend through the air inlet port and pressure chamber and sealably mount to the nozzle discharge plate at a position where the air intake pipe is in fluid communication with the central bore through the plate, whereby air from the air intake pipe is discharged through the central bore in the plate and water within the pressure chamber is discharged through the openings in the plate;
   a discharge pipe connected to the nozzle discharge port; the discharge pipe being positioned beneath the surface of the lagoon water and generally oriented in a horizontal direction, the discharge pipe having an internal cross-sectional area larger than that of the water inlet pipe and further having bubble holes drilled along the top wall of the discharge pipe downstream from the discharge port.

2. The aeration system according to claim 1 wherein the discharge pipe includes a first section adjacent the discharge port followed downstream by a second section, and wherein the bubble holes are provided in the second section only.

* * * * *